(12) United States Patent
Yoshida et al.

(10) Patent No.: US 7,450,822 B2
(45) Date of Patent: Nov. 11, 2008

(54) VIDEO RECORDING APPARATUS AND METHOD, AND EDIT-DATA FORMING APPARATUS, METHOD AND PROGRAM

(75) Inventors: Satoru Yoshida, Hachiouji (JP); Hidekazu Suzuki, Sagamihara (JP); Gaku Miyoshi, Sagamihara (JP); Hiroshi Asai, Sagamihara (JP)

(73) Assignee: Victor Company of Japan, Ltd., Kanagawa-Ken (JP)

( * ) Notice: Subject to any disclaimer, the term of this patent is extended or adjusted under 35 U.S.C. 154(b) by 826 days.

(21) Appl. No.: 10/934,181

(22) Filed: Sep. 3, 2004

(65) Prior Publication Data

US 2005/0069296 A1    Mar. 31, 2005

(30) Foreign Application Priority Data

Sep. 30, 2003    (JP) .............................. 2003-341255

(51) Int. Cl.
*H04N 7/26*    (2006.01)
*H04N 7/00*    (2006.01)

(52) U.S. Cl. ....................................... 386/111; 386/46

(58) Field of Classification Search ................ 386/111, 386/109, 112, 46, 45, 27, 33, 52
See application file for complete search history.

(56) References Cited

U.S. PATENT DOCUMENTS

| 5,488,433 | A | * | 1/1996 | Washino et al. ............. 348/722 |
| 6,546,186 | B2 | | 4/2003 | Fukai et al. ................... 386/52 |
| 2003/0088877 | A1 | * | 5/2003 | Loveman et al. .............. 725/92 |

FOREIGN PATENT DOCUMENTS

JP    2983642    9/1999

* cited by examiner

*Primary Examiner*—Robert Chevalier
(74) *Attorney, Agent, or Firm*—Renner, Kenner, Greive, Bobak, Taylor & Weber

(57) ABSTRACT

An input video signal is recorded, as a moving picture, in a first storage medium with a first compression technique. The input video signal is further recorded, as a moving picture, in a second storage medium different from the first storage medium in storage format with a second compression technique different from the first compression technique. The input video signal is simultaneously recorded in the first and second storage media. Edit data to be used in edition of a video signal recorded on a video tape is formed. Moving-picture files and a data file are retrieved from a storage medium. Each moving-picture file is formed for one cut located between recording start and recording stop in one-time recording of the video signal on the video tape. The data file includes a plurality of pieces of first time information and second time information. Each information corresponds to one of the moving-picture files. The first time information indicates a recording-start time per cut. The second time information indicates a recording-stop time per cut. A plurality of thumbnail pictures are generated, each corresponding to one of the moving-picture files. The thumbnail pictures and the corresponding first and second time information are displayed in a first window on a monitor. At least one of the thumbnail pictures displayed in the first window, and an edition-start point and an edition-stop point corresponding to the one of the thumbnail pictures are displayed in a second window on the monitor. An edition list to be used in edition of the video signal recorded on the video tape is created based on the edition-start and -stop points.

4 Claims, 11 Drawing Sheets

CSV FLIE
FILE NAME:00000000.csv

| asf FILE NAME | TCstart | TCstop |
|---|---|---|
| mc0001.asf | 00:00:00:00 | 00:00:10:00 |
| mc0002.asf | 00:00:10:00 | 00:00:20:00 |
| mc0003.asf | 00:00:20:00 | 00:00:40:00 |
| mc0004.asf | 00:00:40:00 | 00:00:55:00 |

FIG. 9A

CTB

| asf FILE NAME | TCstart | TCstop |
|---|---|---|
| mc0001.asf | 00:00:00:00 | 00:00:10:00 |
| mc0002.asf | 00:00:10:00 | 00:00:20:00 |
| mc0003.asf | 00:00:20:00 | 00:00:40:00 |
| mc0004.asf | 00:00:40:00 | 00:00:55:00 |

FIG. 9B

VIDEO RECORDING APPARATUS AND METHOD, AND EDIT-DATA FORMING APPARATUS, METHOD AND PROGRAM

BACKGROUND OF THE INVENTION

The present invention relates to a video recording apparatus, like a camera-equipped VCR and the corresponding method, and an edit-data forming apparatus, an edit-data forming method and an edit-data forming program for forming edit data to be used in edition of videos recorded by a video recording apparatus.

In most known techniques of recording and editing video signals, video signals are recorded on a video tape (as a storage medium) and then edited on another video tape. Edition on tape, however, takes long time and is not efficient in edition operation. Thus, a major edition technique used at present is so-called nonlinear edition in which a video signal is recorded on a hard disk and edited thereon. Nonlinear edition is performed on a personal computer or other similar edition apparatus. It requires a very short time for indexing and dubbing because a plurality of data are joint to one another on a hard disk, thus very efficient in edition operation.

Most video recording apparatus, like camera-equipped VCRs, still use video tapes as a storage medium. This is because, randomly accessible storage media, such as, hard disks and optical disks, have smaller storage capacity than video tapes and cannot offer high-quality long-time recording. Thus, even for nonlinear edition on hard disk, video signals must be once recorded on a video tape and then edited on a hard disk in camera-equipped VCRs, etc.

Japanese Patent No. 2983642 discloses quick and easy edition of video signals recorded by a camera-equipped VCR.

Nonlinear edition on hard disk for video signals recorded on a video tape, however, requires a signal-recording time to a hard disk, the same as the time for reproducing the video signals that have been recorded on a video tape. For example, it requires 60 minutes to record video signals on a hard disk, which have been recorded on a video tape for 60 minutes.

Moreover, conventional nonlinear edition on hard disk requires that all video signals be recorded on a hard disk, even though what is actually required to be edited is just a part of 60-min video signals, etc., recorded on a video tape, thus taking long time for recording video signals recorded on a video tape, on a hard disk.

SUMMARY OF THE INVENTION

A purpose of the present invention is to provide a video recording apparatus and a video recording method of recording video signals on a storage medium such as a video tape with markedly efficient editing operations.

Another purpose of the present invention is to provide an edit-data forming apparatus, an edit-data forming method and an edit-data forming program for forming edit data that offer markedly efficient editing operations in edition of video signals that have been recorded on a storage medium such a video tape.

The present invention provides a video recording apparatus for recording an input video signal comprising: a first recorder to record the input video signal, as a moving picture, in a first storage medium with a first compression technique; and a second recorder to record the input video signal, as a moving picture, in a second storage medium different from the first storage medium in storage format with a second compression technique different from the first compression technique, the input video signal being simultaneously recorded in the first and second storage media.

Moreover, the present invention provides a video recording method of recording an input video signal comprising the steps of: recording the input video signal, as a moving picture, in a first storage medium with a first compression technique; and recording the input video signal, as a moving picture, in a second storage medium different from the first storage medium in storage format with a second compression technique different from the first compression technique, the input video signal being simultaneously recorded in the first and second storage media.

Furthermore, the present invention provides an edit-data forming apparatus for forming edit data to be used in edition of a video signal recorded on a video tape, the apparatus comprising: a retriever to retrieve moving-picture files and a data file from a storage medium, each moving-picture file being formed for one cut located between recording start and recording stop in one-time recording of the video signal on the video tape, the data file including a plurality of pieces of first time information and second time information, each information corresponding to one of the moving-picture files, the first time information indicating a recording-start time per cut and the second time information indicating a recording-stop time per cut; a thumbnail-picture generator to generate a plurality of thumbnail pictures each corresponding to one of the moving-picture files; and a processor to display the thumbnail pictures and the corresponding first and second time information in a first window on a monitor, display at least one of the thumbnail pictures displayed in the first window and an edition-start point and an edition-stop point corresponding to the one of the thumbnail pictures in a second window on the monitor, and create an edition list to be used in edition of the video signal recorded on the video tape based on the edition-start and -stop points.

Furthermore, the present invention provides an edit-data forming method of forming edit data to be used in edition of a video signal recorded on a video tape, comprising the steps of: retrieving moving-picture files and a data file from a storage medium, each moving-picture file being formed for one cut located between recording start and recording stop in one-time recording of the video signal on the video tape, the data file including a plurality of pieces of first time information and second time information, each information corresponding to one of the moving-picture files, the first time information indicating a recording-start time per cut and the second time information indicating a recording-stop time per cut; generating a plurality of thumbnail pictures each corresponding to one of the moving-picture files; displaying the thumbnail pictures and the corresponding first and second time information in a first window on a monitor; displaying at least one of the thumbnail pictures displayed in the first window and an edition-start point and an edition-stop point corresponding to the one of the thumbnail pictures in a second window on the monitor; and creating an edition list to be used in edition of the video signal recorded on the video tape based on the edition-start and -stop points.

Still furthermore, the present invention provides a computer-implemented edit-data forming method of forming edit data to be used in edition of a video signal recorded on a video tape, comprising the steps of: retrieving moving-picture files and a data file from a storage medium, each moving-picture file being formed for one cut located between recording start and recording stop in one-time recording of the video signal on the video tape, the data file including a plurality of pieces of first time information and second time information, each information corresponding to one of the moving-picture files, the first time information indicating a recording-start time per cut and the second time information indicating a recording-stop time per cut; generating a plurality of thumbnail pictures each corresponding to one of the moving-picture files; displaying the thumbnail pictures and the corresponding first and second time information in a first window on a monitor; displaying at least one of the thumbnail pictures displayed in the first window and an edition-start point and an edition-stop point corresponding to the one of the thumbnail pictures in a second window on the monitor; and creating an edition list to be used in edition of the video signal recorded on the video tape based on the edition-start and -stop points.

BRIEF DESCRIPTION OF DRAWINGS

FIG. 9A shows an exemplary CVA file to be recorded on a memory card 128 shown in FIG. 3;

FIG. 9B shows an exemplary cut table created based on the CVA file shown in FIG. 9A;

DETAILED DESCRIPTION OF PREFERRED EMBODIMENTS

Several embodiments according to the present invention will be disclosed with reference to the attached drawings.

Figure 1:
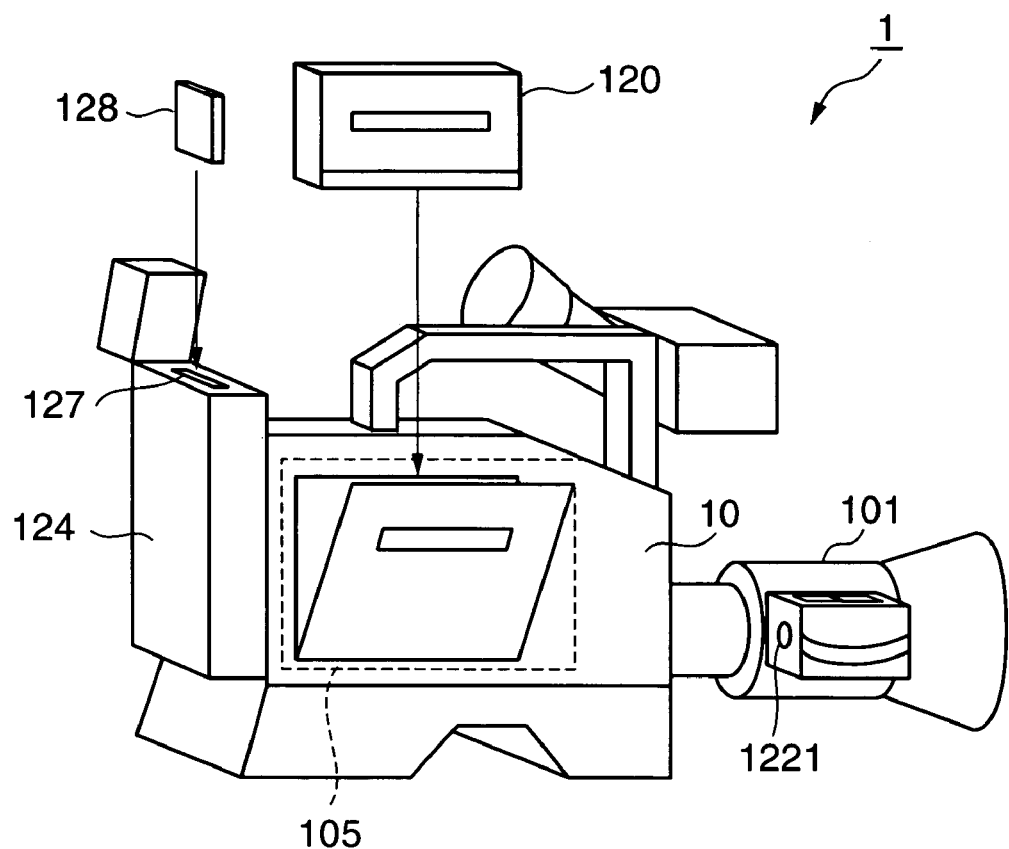
FIG. 1 shows a perspective view indicating an appearance of an embodiment of a video recording apparatus according to the present invention.
Figure 2:
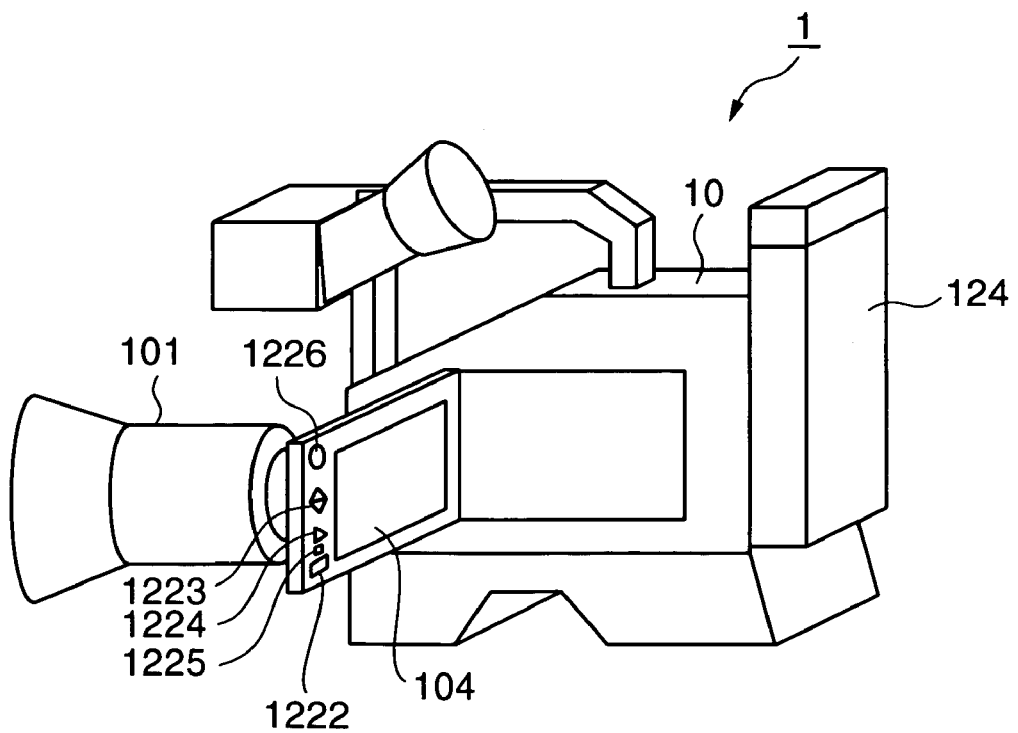
FIG. 2 shows a perspective view indicating another appearance of the embodiment of the video recording apparatus according to the present invention.

Illustrated in FIGS. 1 and 2 is a camera-equipped VCR 1 as an embodiment of a video recording apparatus according to the present invention.

The camera-equipped VCR 1 is provided with a camera unit 101 having several lenses, etc., and a tape recording/reproducing unit 105 for recording/reproducing video signals taken via the camera unit 101 and/or audio signals taken via a microphone (not shown) on/from a cassette tape 120 such as a mini-DV cassette tape. The camera unit 101 is just an example of video signal input means. The cassette tape 120 is a digital video cassette (DVC), but the present invention is not limited to this.

The camera-equipped VCR 1 is detachable from a casing 10 that houses the tape recording/reproducing unit 105. It is also equipped with a memory-card recording/reproducing unit 124 for recording/reproducing video signals taken via the camera unit 101 and/or audio signals taken via a microphone (not shown) on/from a memory card 128. The memory card 128 is an example of storage media, such as Compact Flash (registered trade mark), different from the cassette tape 120.

The memory-card recording/reproducing unit 124 is attached to the back of the casing 10 in this embodiment. It may, however, be attached to any section of the casing 10, such as, the bottom of or inside the casing 10. The minimum requirement is that the memory card 128 be detachable from the camera-equipped VCR 1.

Figure 3:
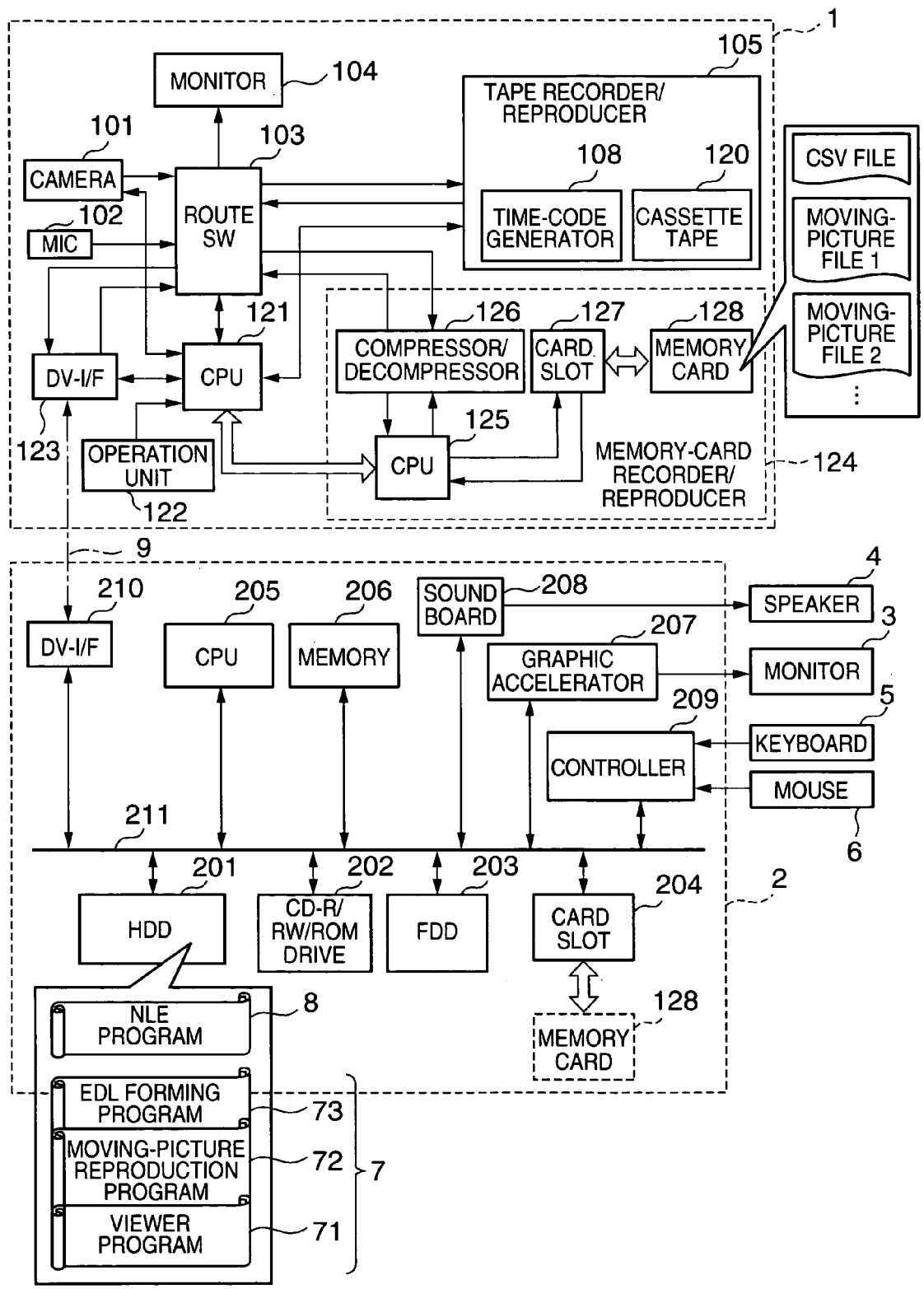
FIG. 3 shows block diagrams of embodiments of a video recording apparatus and an edit-data forming apparatus according to the present invention.

Disclosed next with reference to FIG. 3 is an internal configuration of the camera-equipped VCR 1.

Video signals taken via the camera unit 101 and/or audio signals taken via a microphone 102 are supplied to a route-switching unit 103. When a recording-start/stop button 1221 provided near the camera unit 101, as shown in FIG. 1, is depressed to start recording (for video and audio signals), a CPU 121 controls the route-switching unit 103 so that the video and audio signals are supplied to the tape recording/reproducing unit 105 and also controls the unit 105 to start recording moving pictures. The video signals taken via the camera unit 101 are supplied to a liquid crystal monitor 104 and displayed thereon.

In this embodiment, video and audio signals are recorded on the cassette tape 120 in the tape recording/reproducing unit 105 and also on the memory card 128 in the memory-card recording/reproducing unit 124. In other words, the same contents of the video and audio signals are recorded on the cassette tape 120 and the memory card 128. The video and audio signals may or may not be simultaneously recorded on the cassette tape 120 and the memory card 128. In other words, the recording timing to the cassette tape 120 and the memory card 128 may be slightly different from each other due to differences in recording (writing) speed, driving mechanism, and so on.

To output the video and audio signals reproduced by the tape recording/reproducing unit 105 from the camera-equipped VCR 1, the signals are output via the route-switching unit 103 and a DV interface (DV-I/F) 123.

The video signals reproduced by the tape recording/reproducing unit 105 can be supplied to the liquid crystal monitor 104 and displayed thereon instead of those taken via the camera unit 101.

In addition to the route-switching unit 103 and the tape recording/reproducing unit 105, the CPU 121 controls the camera unit 101 for zooming and the DV interface 123, and also sends commands to a CPU 125 of the memory-card recording/reproducing unit 124 to control this unit 124.

Figure 4:
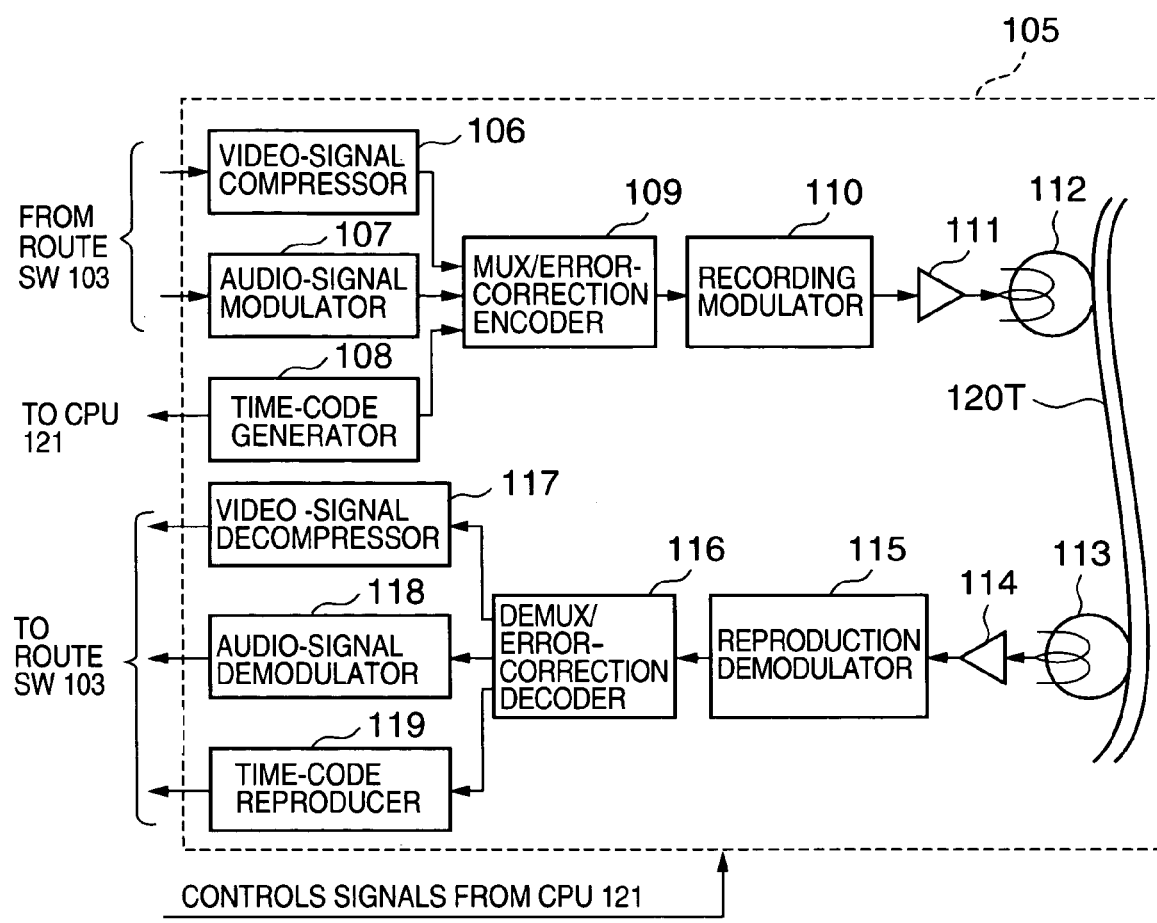
FIG. 4 shows a block diagram of a tape recording/reproducing unit 105 shown in FIG. 3.

The tape recording/reproducing unit 105 is configured as shown in FIG. 4. Each component of the unit 105 is controlled by the CPU 121.

The video signal output from the route-switching unit 103 are supplied to a video-signal compressor 106. The compressor 106 applies A/D conversion and DV compression with intraframe encoding to the input video signals, thus outputting compressed video signals. When the cassette tape 120 is a DVC, it may be subjected to MPEG2 compression.

The audio signals output from the route-switching unit 103 are supplied to an audio-signal modulator 107. The modulator 107 applies A/D conversion and shuffling, etc., to the input audio signals.

A time-code generator 108 generates time codes carrying time information. The time codes may be time-incremental anytime or during recording only.

The compressed video signals output from the video-signal compressor 106, the audio signals output from the audio-signal modulator 107 and the time codes output from the time-code generator 108 are supplied to a multiplexing/error-correction encoder 109 for multiplexing and error-correction encoding.

The output signals of the multiplexing/error-correction encoder 109 are supplied to a recording modulator 110 for modulation so that the signals can be recorded on a tape 120T of the cassette tape 120. The output signals of the recording modulator 110 are amplified by a recording amplifier 111 and recorded on the tape 120T via a recording head 112 mounted on a rotary drum (not shown).

Figure 5:
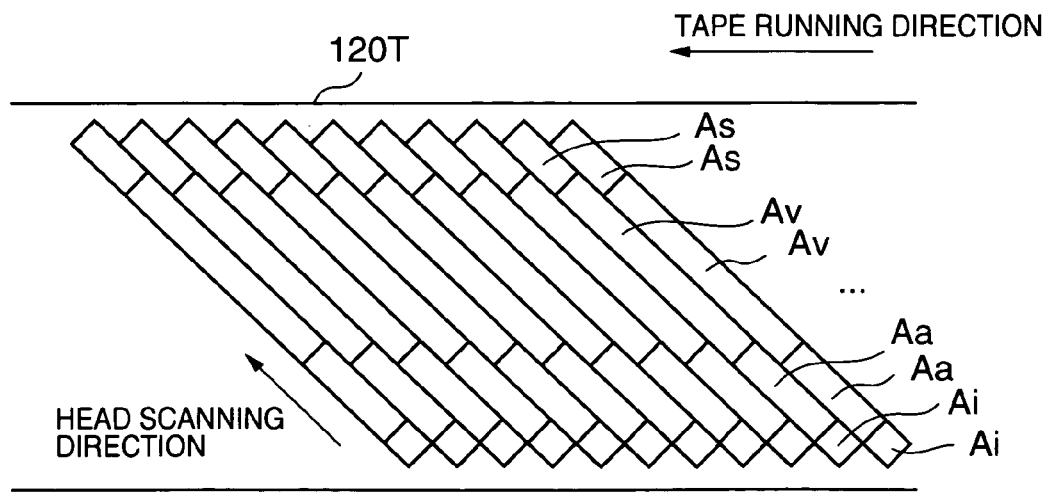
FIG. 5 shows an exemplary pattern of signals recorded on a cassette tape.

Illustrated in FIG. 5 is a pattern of signals recorded on the tape 120T. The video signals are recorded on video areas Av. The audio signals are recorded on audio areas Aa. The time codes are recorded on a part of subcode areas As. Areas Ai are ITI (Insert and Track Information) areas.

Figure 6:
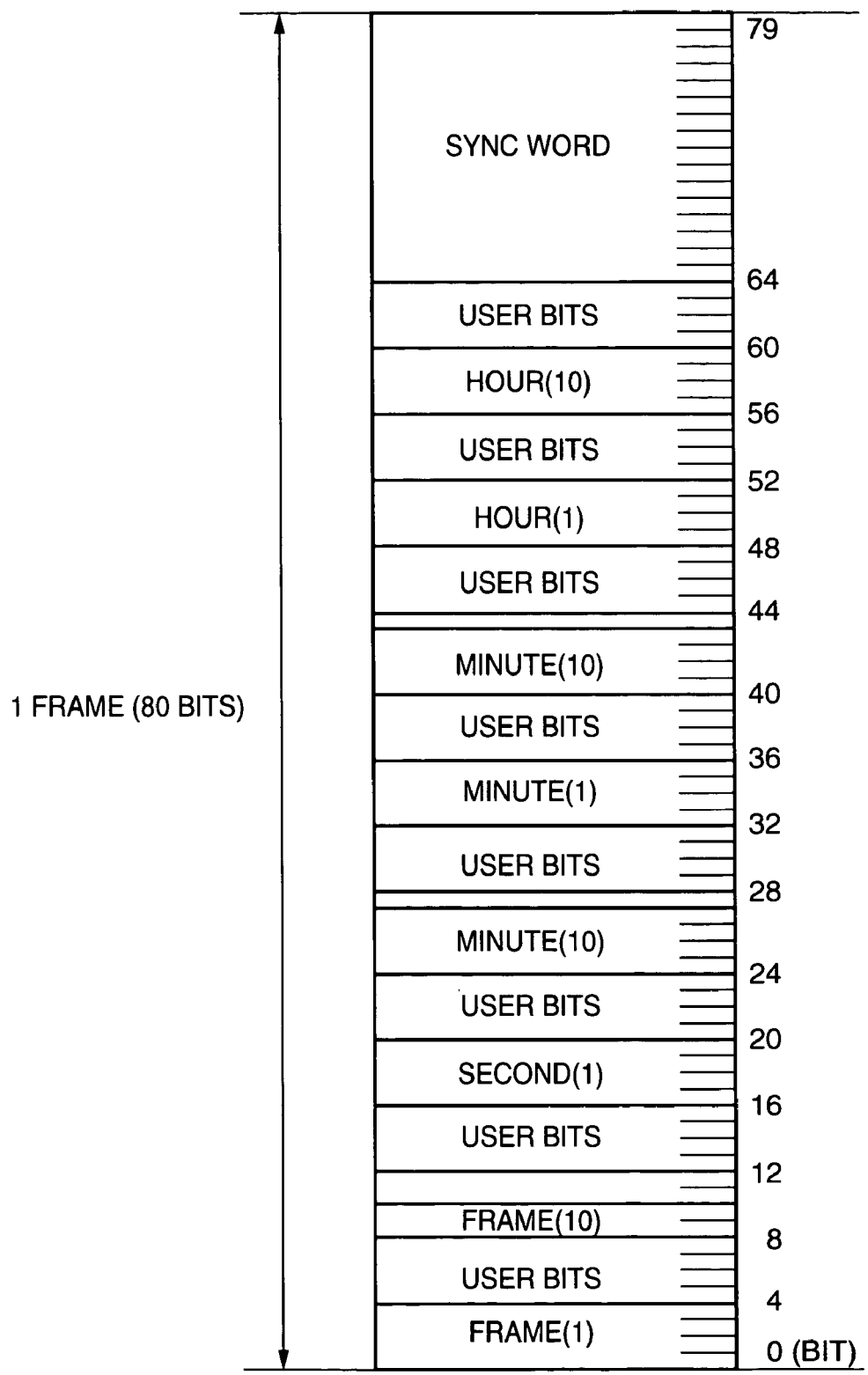
FIG. 6 shows an exemplary time code.

The times codes are illustrated in FIG. 6. One frame consists of 80 bits as shown in FIG. 6. Frames numbers "00" to "29" are given for NTSC signals. Bits 0 to 3 indicate units. Bits 8 and 9 indicate tens. Assigned to the bits in FIG. 6 are units and tens of second, units and tens of minute, and units and tens of hour. Also assigned are user bits in FIG. 6.

Again in FIG. 4, the video signals, the audio signals and the time codes recorded on the tape 120T are reproduced by a reproducing head 113, amplified by a reproduction amplifier 114 and supplied to a reproduction demodulator 115. The demodulator 115 demodulates the video signals, the audio signals and the time codes for reproduction. The demodulated video signals, audio signals and time codes are supplied to a demultiplexing/error-correction decoder 116 for error-correction decoding and demultiplexing.

The demultiplexed video signals are supplied to a video-signal decompressor 117 for decompression and D/A conversion of the compressed video signals. The demultiplexed audio signals are supplied to an audio-signal demodulator 118 for demodulation and D/A conversion of the audio signals. The demultiplexed time codes are supplied to a time-code reproducer 119 for reproduction of time information carried by the time codes.

The video signals output from the video-signal decompressor 117, the audio signals output from the audio-signal demodulator 118, and the time codes output from the time-code reproducer 119 are supplied to the route-switching unit 103.

As disclosed above, the video signals reproduced in the tape recording/reproducing unit 105 may be displayed on the liquid crystal monitor 104 and/or the video signals, audio signals and time codes may be output from the camera-equipped VCR 1 via the DV interface 123.

As shown in FIG. 3, the memory-card recording/reproducing unit 124 is equipped with the CPU 125, a compressor/decompressor 126 for compressing/decompressing video and audio signals, and a card slot 127 into which a memory card 128 is inserted for electrical and mechanical contact therebetween.

The compressor/decompressor 126 compresses video signals, for example, by MPEG4 (ISO/IEC14496/MPEG-4, ITU-T H. 264) compression while compresses audio signals, for example, by ITU-T G. 726 compression.

The compressed video and audio signals are supplied to the CPU 125 for multiplexing. The multiplexed video and audio signals are supplied to the card slot 127.

The CPU 125 works as a driver to write/read information on/from the memory card 128 via the card slot 127.

In detail, the CPU 125 writes the multiplexed video and audio signals on the memory card 128 via the card slot 127. Moreover, it controls the card slot 127 so that the multiplexed video and audio signals, and also CSV (Comma Separated Value) files which will be disclosed later, can be recorded on the memory card 128.

The mini-DV cassette tape 120 can store DV-compressed video signals over 60 minutes. In addition, a 64-MByte memory card 128 can store 128 kbps- and MPEG4-video signals over 60 minutes. Therefore, simultaneously with the mini-DV cassette tape 120, this 64-MByte memory card 128 can store all of the video and audio signals identical to those to be recorded on the cassette tape 120.

In reproduction of the video and audio signals recorded on the memory card 128, the multiplexed video and audio signals are supplied to the CPU 125 via the card slot 127. The video and audio signals are demultiplexed from each other by the CPU 125 and supplied to the compressor/decompressor 126. The video signals are subjected to MPEG4 decompression. The audio signals are subjected to ITU-T G. 726 decompression. The reproduced video signals may be displayed on the liquid crystal monitor 104 via the CPU 121 and the route-switching unit 103 and/or output from the camera-equipped VCR 1 via the CPU 121 and the DV interface 123.

Figure 7:
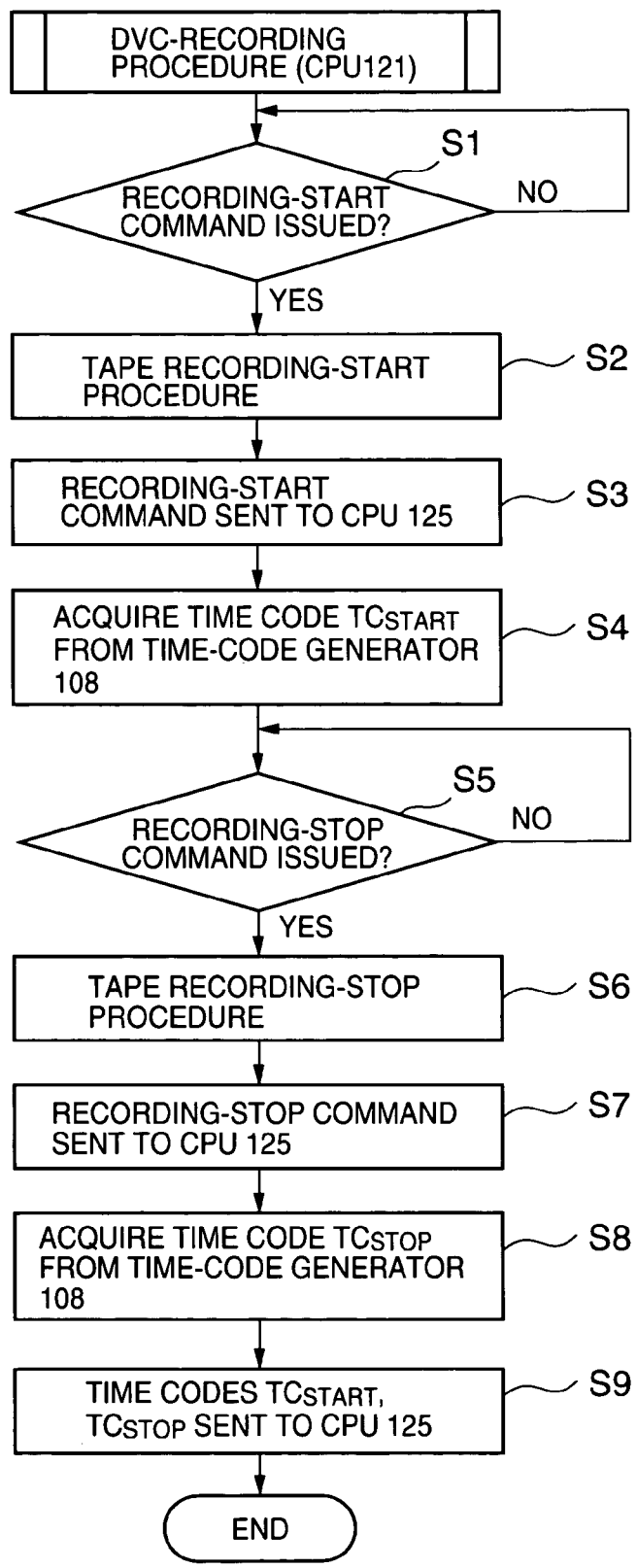
FIG. 7 shows a flowchart of a procedure executed by a CPU 121 shown in FIG. 3.
Figure 8:
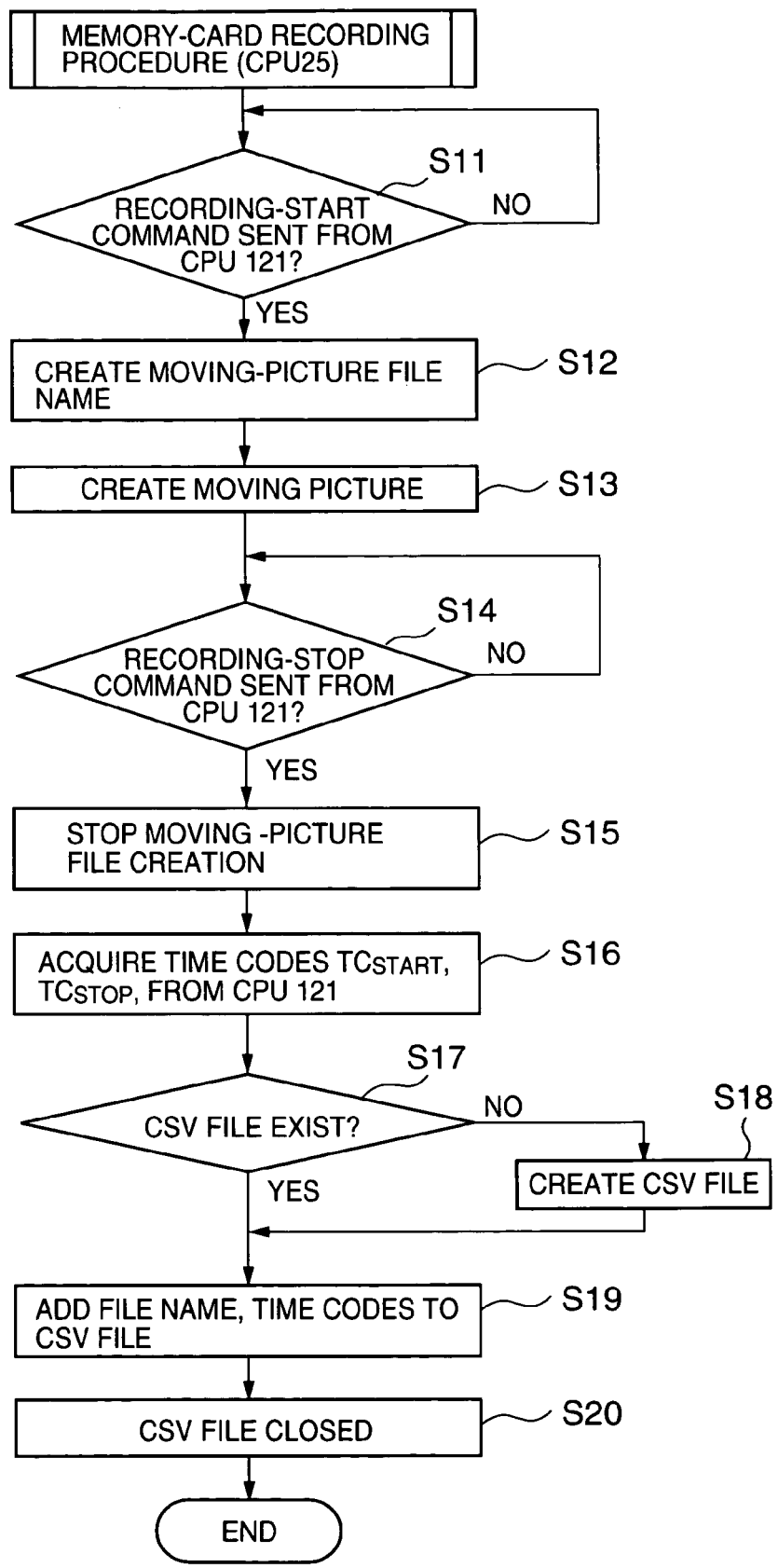
FIG. 8 shows a flowchart of a procedure executed by a CPU 125 shown in FIG. 3.

Disclosed next with reference to FIGS. 7 and 8 is simultaneous recording operations in the tape recording/reproducing unit 105 and the memory-card recording/reproducing unit 124.

Shown in FIG. 7 is a CPU-121's DVC-recording procedure (sequence) for controlling the tape recording/reproducing unit 105. Shown in FIG. 8 is a CPU-125's memory-card recording procedure (sequence) for controlling the memory-card recording/reproducing unit 124.

In FIG. 7, the CPU 121 determines, in step S1, whether or not the recording-start/stop button 1221 (FIG. 1) has been depressed to issue a recording-start command.

The sequence returns to step S1 if no recording-start command has been issued (NO). On other hand, it goes to step S2, if the command has been issued (YES), in which the CPU 121 executes a recording-start procedure to the tape cassette 120T of the cassette tape cassette 120.

In step S3, the CPU 121 communicates with the CPU 125 to send the recording-start command thereto.

Next, in step S4, the CPU 121 communicates with the time-code generator 108 in the tape recording/reproducing unit 105 to acquire a time code $TC_{start}$ indicating the beginning of recording.

The CPU 121 determines, in step S5, whether or not the recording-start/stop button 1221 has been depressed to issue a recording-stop command.

The sequence returns to step S5 if no recording-stop command has been issued (NO). On other hand, it goes to step S6, if the command has been issued (YES), in which the CPU 121 executes a recording-stop procedure to the tape cassette 120T of the cassette tape cassette 120.

In step S7, the CPU 121 communicates with the CPU 125 to send the recording-stop command thereto.

Next, in step S8, the CPU 121 communicates with the time-code generator 108 to acquire a time code $TC_{stop}$ indicating the halt of recording.

The CPU 121 communicates with the CPU 125, in step S9, to send the recording-start time code $TC_{start}$ acquired in step S4 and the recording-stop time code $TC_{stop}$ acquired in step S8 to the CPU 125.

Disclosed next with reference to FIG. 8 is the CPU-125's procedure (sequence) for controlling the memory-card recording/reproducing unit 124.

In S11, the CPU 125 determines whether or not the recording-start command has been sent from the CPU 121.

The sequence returns to step S11 if the recording-start command has not been sent (NO). On other hand, it goes to step S12, if the command has been sent (YES), in which the CPU 125 creates one or more of moving-picture file names. A moving-picture file is an asf file composed of the video and audio signals compressed and multiplexed as disclosed above. A moving-picture file name is, for example, "mc0001.asf", the file number being increased, such as, "mc0002.asf", "mc0003.asf", . . . , for each creation of moving-picture file name.

Once one or more of moving-picture file names has or have been created, in step S13, the CPU 125 controls the compressor/decompressor 126 to start creation (encoding) of one or more of moving-picture files.

The CPU 125 determines, in step S14, whether or not the recording-stop command has been sent from the CPU 121.

The sequence returns to step S14 if the recording-stop command has not been sent (NO). On other hand, it goes to step S15, if the command has been sent (YES), in which the CPU 125 controls the compressor/decompressor 126 to stop file creation and writes the created moving-picture file(s) on the memory card 128.

In step S16, the CPU 125 acquires the time code $TC_{start}$ indicating the beginning of recording and also the time code $TC_{stop}$ indicating the halt of recording from the CPU 121.

The CPU 125 determines, in step S17, whether or not at least one CSV file has already existed in the memory card 128.

If no CSV files have existed (NO), the CPU 125 creates a CSV file and writes this file on the memory card 128, in step S18. On the other hand, if it has existed (YES), in step S19, the CPU 125 adds to the CSV file one or more of moving-picture file names, the time code(s) $TC_{start}$ at the beginning of recording, and the time code(s) $TC_{stop}$ at the halt of recording. Then, the CSV file is closed in step S20.

FIG. 9A shows an exemplary CSA file. A CSA-file name is indicated by the user bits of the time code shown in FIG. 6. Any message, such as a memo on interview, can be entered on the user bits. Every user bit is zero when no data is entered (a default state). Shown in FIG. 9A is "00000000.csv" which is a file name in the default state. Any file name can be entered via a file-enter button 1223 in an operation unit 122, provided near the liquid crystal monitor 104, as shown in FIG. 2.

Recorded in the CSV file in FIG. 9A are several moving-picture file names (asf file names) and the corresponding time codes $TC_{start}$ at the beginning of recording and time codes $TC_{stop}$ at the halt of recording.

The CSV file is indicated as a table in FIG. 9A for easy understanding. It is, however, be a data stream in which data are separated by commas one another.

A CSV file such as shown in FIG. 9A is created for each of several cassette tapes 120 when one user bit of the time code is assigned to a CSV file name for one cassette tape 120.

It is determined in step S17 (FIG. 8) whether a CSV file corresponding to a cassette tape 120 now in use exists in the memory card 128. When the CSV file "00000000.csv" exists in the memory card 128 and then user bits "00000001" are entered to a newly used cassette tape 120, a CSV file "00000001.csv" is newly created.

In contrast, when all user bits are left in a default state to each of several cassette tapes 120, moving-picture file names for these cassette tapes and the corresponding time codes $TC_{start}$ at the beginning of recording and time codes $TC_{stop}$ at the halt of recording are recorded in one CSV file "00000000csv".

As illustrated in FIG. 3, recorded on the memory card 128 are at least one CSV file and also at least one moving-picture file created as disclosed above. Two or more of moving-picture files are, however, usually created because one moving-picture file is created for each recording start-and-stop operation in the tape recording/reproducing unit 105. Each of several moving-picture files contains one scene (cut) that has been taken via the camera unit 101 and recorded on the cassette tape 120.

As shown in FIG. 2, provided near the liquid crystal monitor 104 is a table-display button 1222 belonging to the operation unit 122. When this button 1222 is depressed, the CPU 121 displays a cut table CTB on the liquid crystal monitor 104 based on a CSV file recorded on the memory card 128.

The cut table CTB lists time codes $TC_{start}$ indicating the beginning of recording and time codes $TC_{stop}$ indicating the halt of recording, each code corresponding one cut (moving-picture file), such as shown in FIG. 9B.

Indicated by hatching in FIG. 9B is the present location of a cursor. The cursor can be shifted by depressing a cursor button 1223 (belonging to the operation unit 122) also provided near the liquid crystal monitor 104, to select any moving-picture file. When the button 1223 is depressed, the CPU 121 commands the CPU 125 to reproduce a moving-picture file selected by the cursor on the liquid crystal monitor 104.

Also provided near the liquid crystal monitor 104 are a stop button 1225 and an erase button 1226, both belonging to the operation unit 122, as shown in FIG. 2.

If there is any unwanted cut (moving-picture file), it can be erased by depressing the erase button 1226. When the button 1226 is depressed, the CPU 121 commands the CPU 125 to erase one or more of unwanted moving-picture files from the memory card 128.

In this erasing operation, however, the CPU 121 (CPU 125) does not erase the time code(s) $TC_{start}$ (at the beginning of recording) and also the time code(s) $TC_{stop}$ (at the halt of recording) of the erased moving-picture file(s) from a CSV file. No only that, the CPU 121 (tape recording/reproducing unit 105) does not erase the video and audio signals (corresponding to the erased moving-picture file or files) from the cassette tape 120.

Erasure of moving-picture file(s) of unwanted cut(s) increases the remaining storage capacity of the memory card 128. In contrast, prohibition of erasure of CSV-file information, such as the time codes $TC_{start}$ and $TC_{stop}$, allows a user to confirm that a moving-picture file(s) has (have) been erased from the memory card 128.

As disclosed above in detail, the camera-equipped VCR 1 according to this embodiment has the following functions:

(1) recording a series of video signals taken via the camera unit 101 on the cassette tape 120 via the tape recording/reproducing unit 105;

(2), simultaneously with (1), recording each cut carried by the video signals (to be recorded on the cassette tape 120) on the memory card 128, as a moving-picture file (asf file), via the memory-card recording/reproducing unit 124; and (3) recording one or more of CSV files on the memory card 128, each CSV file being used for creating a cut table CTB listing file names of moving-picture files and the corresponding time codes $TC_{start}$ at the beginning of recording and time codes $TC_{stop}$ at the halt of recording.

Moving-picture files to be recorded on the memory card 128 are an asf-file type while files for creating cut tables CTB are a CSV-file type, in this embodiment. Not only that, any other appropriate file type can be used in this invention.

Moreover, not only a card-type storage medium (memory card 128), any other type of storage medium, preferably, a semiconductor memory, detachable from and randomly accessible to the camera-equipped VCR 1 can be used.

Disclosed next are an edit-data forming apparatus and an edit-data forming program for forming an edit list called an EDL (Edit Decision List) to be used in edition of video and audio signals recorded on the cassette tape 120.

As shown in FIG. 3, an edit-data forming apparatus 2 is equipped with a hard disk drive (HDD) 201 storing several types of software including a fundamental software OS (Operating System) for the entire control of the apparatus 2 and an edit-data forming program. The edit-data forming apparatus itself can be realized by a general-purpose personal computer.

Stored in the HDD 201 are, as shown in FIG. 3, an edit-data forming program 7 and an NLE (Nonlinear Edition) program 8 for nonlinear edition.

The edit-data forming program 7 contains a viewer program 71, a moving-picture reproduction program 72 and an EDL forming program 73.

The viewer program 71 is used to retrieve one or more of CSV files from the memory card 128 and display several thumbnail still pictures each corresponding to one moving-picture file of the retrieved CSV file. The moving-picture reproduction program 72 is used to reproduce moving-picture files and set an inpoint indicating the edition-start moment and an outpoint indicating the edition-complete moment. The EDL forming program 73 is used to create an EDL file.

The edit-data forming apparatus 2 is equipped further with a CD-R/RW/ROM drive (called CD drive, hereinafter) 202 for writing data on CD-R or CD-RW, or retrieving data from CD-ROM, a floppy (registered trademark) disk drive (FDD) 203, and a card slot 204.

The edit-data forming program 7 may be offered to users, for example, in the form of CD-ROM. Each user can retrieve the edit-data forming program 7 from a CD-ROM with the CD drive 202 and install it in the HDD 201.

The edit-data forming apparatus 2 is still equipped further with a CPU 205 for controlling the entire operations of the apparatus 2, a memory (RAM) 206 to be used as a working area for several types of operations, a graphic accelerator 207 for displaying videos on a monitor 3, a sound board 208 for outputting sound via a speaker 4, a controller 209 for receiving input signals from a keyboard 5 or a mouse 6, and a DV interface (DV-I/F) 210. These components are connected to one another via a bus 211.

In creation of an EDL for editing video and audio signals recorded on the cassette tape 120, the memory card 128 storing one or more moving-picture files and CSV files is picked up from the card slot 127 in the memory-card recording/reproduction unit 124 and inserted into the card slot 127 of the edit-data forming apparatus 2.

Disclosed below in detail are the viewer program 71, the moving-picture reproduction program 72, and the EDL forming program 73.

[Viewer Program 71]

Figure 10:
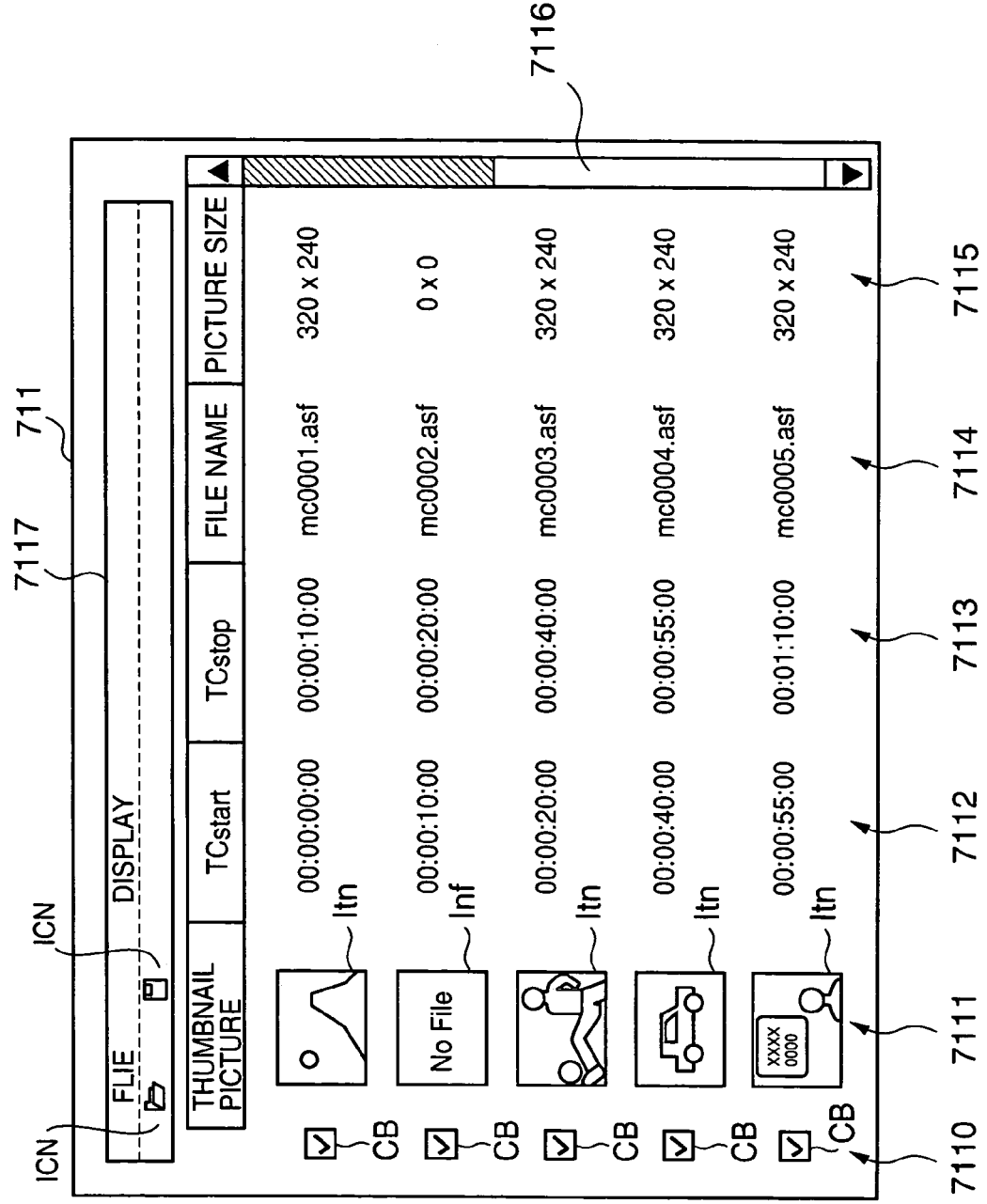
FIG. 10 shows an exemplary viewer window opened based on a viewer program.

When the viewer program 71 is executed, the CPU 205 controls the graphic accelerator 207 to open a viewer window 711 on the monitor 3, as illustrated in FIG. 10.

Retrieval of a CSV file from the memory card 128 via a menu on a tool bar 7117 or with an icon ICN initiates the CPU 205 to retrieve, from the CSV file, a file name and the corresponding time code $TC_{start}$ at the beginning of recording and time code $TC_{stop}$ at the halt of recording for each moving-picture file, and display the retrieved information on the corresponding columns 7112 to 7114 in the viewer window 711, as shown in FIG. 10.

In addition, the CPU 205 generates several thumbnail (still) pictures Itn for moving pictures, for example, from the head moving picture in each moving-picture file and displays them on a column 7111 in the viewer window 711, as shown in FIG. 10. The thumbnail pictures Itn may start from the head picture or any other intermediate picture of a moving-picture file. Each thumbnail picture Itn may be a moving picture. Nevertheless, it is preferably a still picture because it is used only for checking the content of each recorded cut (scene).

In the viewer window 711 shown in FIG. 10, several picture sizes (the number of pixels in horizontal and vertical directions) are displayed on a column 7115, and check boxes CB are displayed on a column 7110. Any information displayed in the viewer window 711 can be scrolled up or down with a scroll bar 7116 provided at the right-most part of the window 711.

It should be noticed that a caution sign Inf "No File" is displayed on the column 7111, instead of a thumbnail picture Itn. This sign Inf "No File" shown in FIG. 10 reminds a user that a moving-picture file having a file name "mc0002. asf" has been erased from the memory card 128.

If a user does not want to display the caution sign Inf "No File" on the viewer window 711, he or she can click on a check mark on the corresponding check box CB to erase this mark and perform a file-save operation via the menu on the tool bar 7117 or with an icon ICN.

When the user has performed the check-mark erasure and file-save operations, the CPU 205 erases, from the CSV file, the file name and the time codes $TC_{start}$ and $TC_{stop}$ on the row corresponding to the check-mark-erased check box CB, and records this information-erased CSV file on the memory card 128, as a new CSV file. The viewer window 711 with no caution sign Inf "No File" can be displayed by retrieving the new CSV file from the memory card 128.

In summary, the viewer program 71 makes a personal computer (the edit-data forming apparatus 2) execute the following steps:

Step 1: retrieve moving-picture files and a CSV file from the memory card 128;

Step 2: generate thumbnail pictures Itn (or, with one or more of caution signs Inf) based on the moving-picture files having file names in the CSV file; and Step 3: open the viewer window 711 with the thumbnail pictures Itn (or, with one or more of caution signs Inf) and corresponding CSV-file information, such as shown in FIG. 10.

[Moving-Picture Reproduction Program 72]

The moving-picture reproduction program 72 is executed when any thumbnail picture Itn in the viewer window 711 is double-clocked on with the mouse 6.

Figure 11:
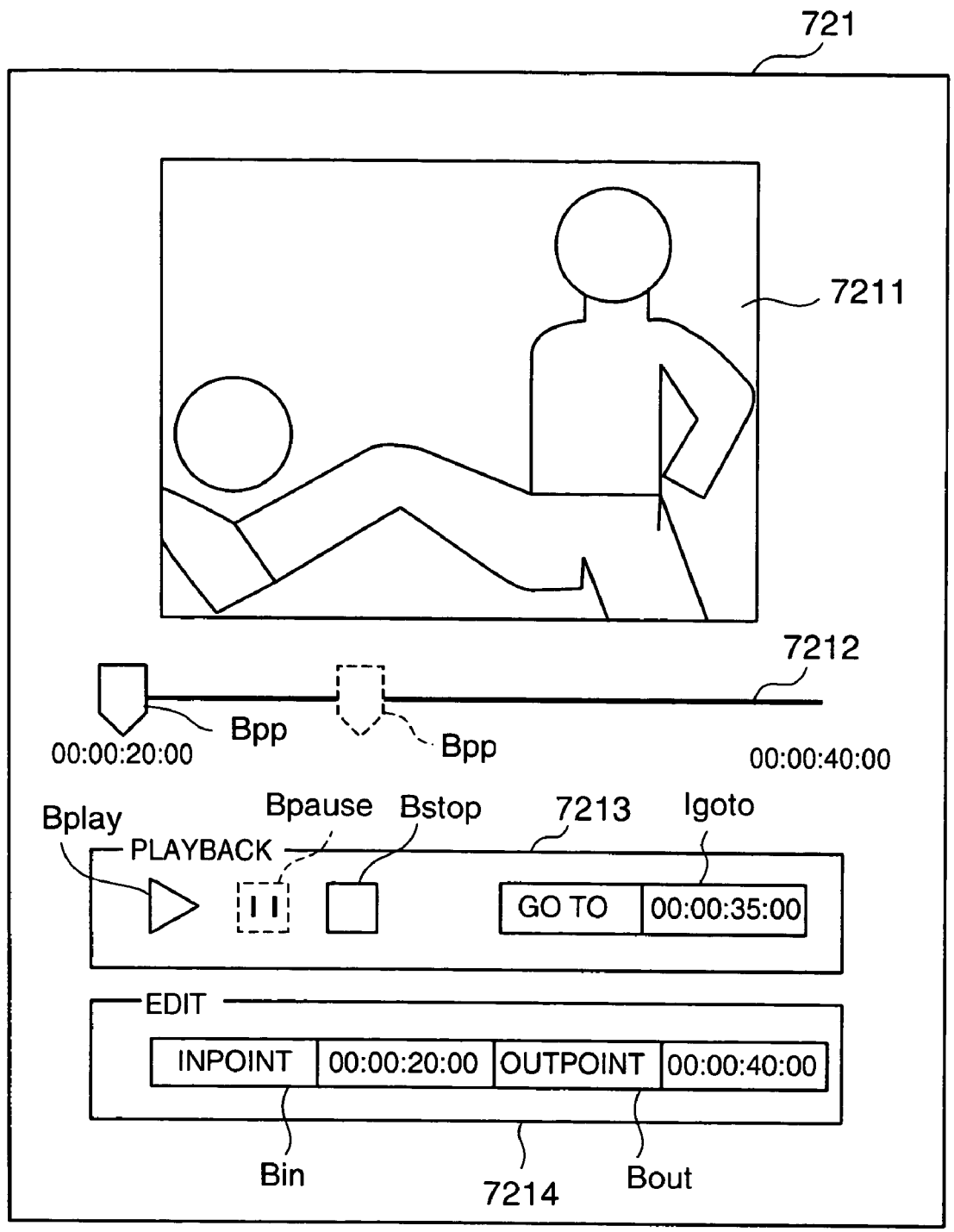
FIG. 11 shows an exemplary moving-picture reproduction window opened based on a moving-picture reproduction program.

The CPU 205 controls the graphic accelerator 207 to open a moving-picture reproduction window 721, such as shown in FIG. 11, on the monitor 3.

The moving-picture reproduction window 721 contains a reproduction zone 7211 for reproducing a moving-picture file, a reproduction-state indication zone 7212 for indicating the progress of moving-picture-file reproduction (playback), an instruction zone 7213 for instructing moving-picture-file reproduction, stop, pause, etc., an edit-point set zone 7214 for setting an inpoint indicating the edition-start moment and an outpoint indicating the edition-complete moment.

The reproduction zone 7211 has a larger area than the thumbnail pictures Itn to be displayed on the viewer window 711. This allows a user to view a moving picture displayed on the zone 7211 to check the content of a moving-picture file corresponding to any one of the thumbnail pictures Itn.

Displayed at the left-most part of the reproduction-state indication zone 7212 is a time code $TC_{start}$, such as "00:00: 20:00" at the beginning of recording of a moving-picture file to be reproduced on the reproduction zone 7211. Displayed at the right-most part of the zone 7212 is a time code $TC_{stop}$, such as "00:00:40:00" at the halt of recording of that moving-picture file. A reproduction-position indicating bar $B_{pp}$ moves from left to right on the zone 7212 as reproduction of the moving-picture file proceeds.

Provided in the instruction zone 7213 are a playback icon $B_{play}$, a pause icon $B_{pause}$, a stop icon $B_{stop}$, and an enter box $I_{goto}$ for directly setting a reproduction time.

Entered in the edit-point set zone 7214 are a time code (inpoint) $TC_{start}$ at the beginning of recording "00:00:20:00" and a time code (outpoint) $TC_{stop}$ at the halt of recording "00:00:40:00".

An inpoint setting icon $B_{in}$ and/or an outpoint setting icon $B_{out}$ can be clicked on with the mouse 6 to set an inpoint and/or an outpoint at any position between the time codes $TC_{start}$ and $TC_{stop}$.

In summary, the moving-picture reproduction program 72 makes a personal computer (the edit-data forming apparatus 2) execute the following steps:

Step 4: reproduce a moving-picture file selected based on a thumbnail picture Itn and display the reproduced file on the moving-picture reproduction window 721; and Step 5: set at least either an inpoint indicating the beginning of edition or an outpoint indicating the completion of edition.

[EDL Forming Program 73]

Figure 12:
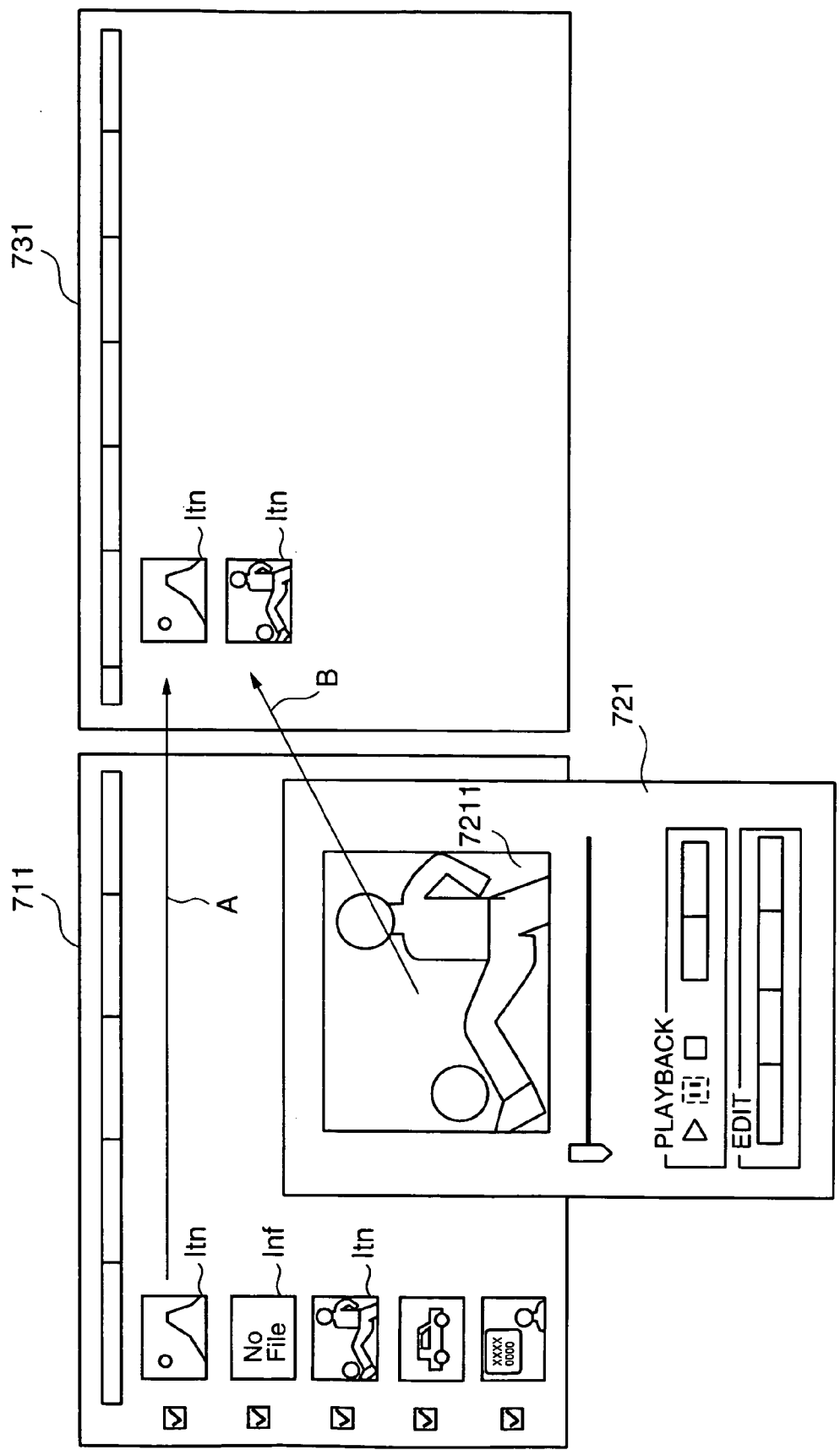
FIG. 12 shows an exemplary multi window containing the viewer window (FIG. 10), the moving-picture reproduction window (FIG. 11), and an EDL forming window opened based on an EDL forming program.

When the EDL forming program 73 is executed while the viewer window 711 is opened, the CPU 205 controls the graphic accelerator 207 to open a EDL forming window 731, such as shown in FIG. 12, on the monitor 3.

As illustrated in FIG. 12, also opened on the monitor 3 is the moving-picture reproduction window 721. In FIG. 12, the viewer window 711 (FIG. 10), the moving-picture reproduction window 721 (FIG. 11), and the EDL forming window 731 are schematically illustrated, as a multi window.

No thumbnail pictures Itn are displayed on the EDL forming window 731 in the initial state in which the EDL forming program 73 is executed to open the EDL forming window 731.

As illustrated in FIG. 12, a drag-and-drop operation with the mouse 6 to move a thumbnail picture Itn (of a moving-picture file to be edited among moving-picture files for which thumbnail pictures Itn are displayed on the viewer window 711) to the EDL forming window 731, as indicated by an arrow A, makes a copy of that thumbnail picture Itn on the window 731.

The moving-picture file to be edited for which the thumbnail picture Itn has been copied on the EDL forming window 731 is then listed up in an EDL-file edition list.

No only that, a drag-and-drop operation with the mouse 6 to move a picture (on the reproduction zone 7211 in the moving-picture reproduction window 721) to the EDL forming window 731, as indicated by an arrow B, can list up another moving-picture file in the edition list of the EDL file.

Figures 13, 14:
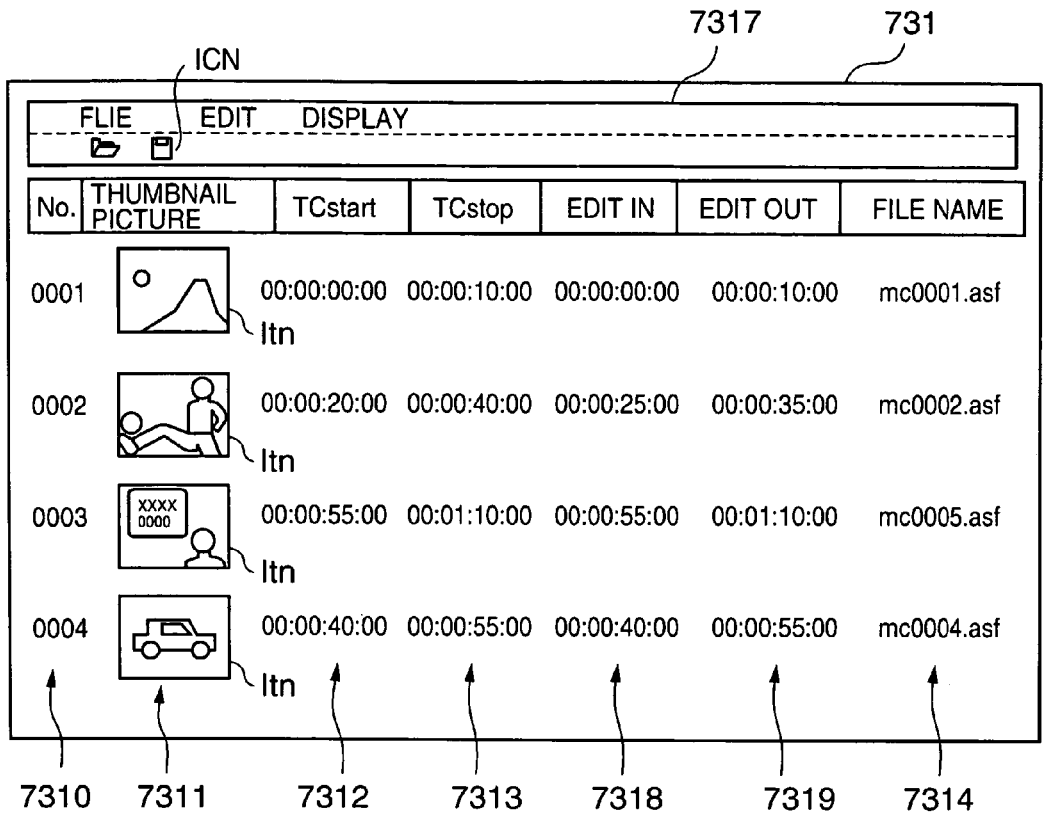
FIG. 13 shows an exemplary EDL forming window.
FIG. 14 shows an exemplary EDL-file edit list.

Illustrated in FIG. 13 is the detail of the EDL forming window 731 in which several moving-picture files have been listed up in the EDL-file edition list.

In FIG. 13, indicated in columns 7310, 7311, 7312 and 7313 are moving-picture file numbers, thumbnail pictures Itn, time codes $TC_{start}$ and time codes $TC_{stop}$, respectively, with file names of the moving-picture files in a column 7314, inpoints (edit in) at the beginning of edition in a column 7318, and outpoints (edit out) at the completion of edition in a column 7319.

Comparison between FIGS. 10 and 13 teaches that the order of moving-picture files in the EDL-file edit list has nothing to do with the order of the thumbnail pictures Itn displayed on the viewer window 711.

What is set on the EDL forming window 731 in FIG. 13 is as follows:

for moving-picture files No. 0001, 0003 and 0004: all moving-picture files located between the time codes $TC_{start}$ and $TC_{stop}$ are used in edition; and for a moving-picture file No. 0002: only several moving-picture files located between the time codes $TC_{start}$ and $TC_{stop}$ are used for edition.

Indicated in EDIT IN and EDIT OUT for the moving-picture file No. 0002 in FIG. 13 are an inpoint "00:00:25:00" and an outpoint "00:00:35:00" set with the inpoint setting icon $B_{in}$ and the outpoint setting icon $B_{out}$, respectively, on the moving-picture reproduction window 721 shown in FIG. 11.

In detail, the time codes "00:00:20:00" and "00:00:40:00" set in INPOINT and OUTPOINT in the edit-point set zone 7124 shown in FIG. 11 are changed to the inpoint and outpoint "00:00:25:00" and "00:00:35:00" with the icons $B_{in}$ and $B_{out}$, respectively.

In summary, each time set in the column 7318 (EDIT IN) and also each time set in the column 7319 (EDIT OUT) in FIG. 13 are equal to the time codes $TC_{start}$ and $TC_{stop}$, respectively, when all moving-picture files are used in edition whereas equal to the time (time code) set in the moving-picture reproduction window 721 (FIG. 11) when several moving-picture files only are used in edition.

When a preview runs via a menu on a tool bar 7317 or an icon ICON shown in FIG. 13, the moving-picture reproduction program 72 is executed so that the CPU 205 retrieves moving-picture files one by one from the memory card 128 and displays them on the reproduction zone 7211 in the moving-picture reproduction window 721.

The EDL file can be saved in a designated memory, such as the HDD 201, by an EDL-file save operation via the menu on the tool bar 7317 or an icon ICON shown in FIG. 13.

FIG. 14 shows an exemplary EDL-file edition list. Several items shown in FIG. 14 indicate the following matters:

Item "No.": numbers or the order of edition

Item "MODE": mode types, an assemble mode or an insert mode

Item "Play IN": time code indicting a reproduction-start position on the cassette tape 120

Item "Play OUT": time code indicting a reproduction-stop position on the cassette tape 120

The Items "Play IN" and "Play OUT" indicate reproduction positions (area) on the cassette tape 120 set in the tape recording/reproducing unit 105.

Item "Record IN": recording-start time on HDD, such as the HDD 201, in nonlinear edition Item "Record OUT": recording-stop time The recording-start and -stop times are time codes, time incremental only during (video) recording.

The EDL-file edition list, such as shown in FIG. 14, indicates the order of scenes (cuts) of video signals to be reproduced from the cassette tape 120 and recorded on the HDD 201, for example.

In summary, the EDL forming program 73 makes a personal computer (the edit-data forming apparatus 2) execute the following steps:

Step 6: arrange moving-picture files on the EDL forming window 731 to create an EDL-file edition list initiated by a drag-and-drop operation with the mouse 6 to move thumbnail pictures Itn from the viewer window 711 or a picture from the reproduction zone 7221 in the moving-picture reproduction window 721 to the EDL forming window 731, the listed information on moving-picture files including thumbnail pictures Itn and the corresponding edition inpoints and outpoints; and Step 7: create an EDL file for nonlinear edition of video signals recorded on the cassette tape 120 based on the edition list created on the EDL forming window 731.

Disclosed next is nonlinear edition using the EDL file created as above.

Nonlinear edition is to edit video signals recorded on the cassette tape 120 and record the edited signals on HDD.

The edit-data forming apparatus 2, an embodiment of the present invention, carries the NLE program 8 stored on the HDD 201 for nonlinear edition so that the apparatus 2 can work as a nonlinear editor.

Disclosed below is how the edit-data forming apparatus 2 works as a nonlinear editor, with an EDL file already stored in the HDD 201.

As shown in FIG. 3, the DV interface 123 in the camera-equipped VCR 1 and the DV interface 210 in the edit-data forming apparatus 2 are connected to each other with a cable 9, for transmission of video and audio signals and also control signals therebetween.

When the NLE program 8 is executed, the CPU 205 in the edit-data forming apparatus 2 looks up the EDL file to sequentially generate control signals for controlling reproduction start and stop to the cassette tape 120 in the camera-equipped VCR 1.

The control signals are sent to the CPU 121 in the camera-equipped VCR 1 via the DV interfaces 210 and 123. The CPU 121 controls reproduction start and stop to the cassette tape 120 set in the tape recording/reproducing unit 105 based on the control signals.

Video and audio signals reproduced from the cassette tape 120 are sent to the HDD 201 via the CPU 121 and DV interfaces 123 and 210 and recorded in the HDD 201 with edited scenes (cuts).

Nonlinear edition in this embodiment selectively performs reproduction from the cassette tape 120 based on an EDL-file edition list created as disclosed above. There is thus no necessity to reproduce every video signal from the cassette tape 120 and record it in the HDD 201.

Moreover, it is allowed to create an EDL-file edition list while checking the content of cuts of moving-picture files recorded on the randomly accessible memory card 128 and listing up selected cuts only.

Therefore, the edit-data forming apparatus and the edit-data forming program according to the present invention offer a highly efficient edition operation.

In nonlinear edition with any other personal computer, not with the edit-data forming apparatus 2 of this invention, an EDL file can be installed in the other personal computer via a CD-R or CD-RW through the CD drive 202, via a floppy disk through the FDD 203, or over a network.

Moreover, in nonlinear edition with either the edit-data forming apparatus 2 or any other personal computer, a reproducing apparatus to be used in reproduction from the cassette tape 120 is not limited to the camera-equipped VCR 1 of this invention that has performed recording to the cassette tape 120, any other types of camera-equipped VCRs or standalone recording apparatus being available as such reproducing apparatus.

It is further understood that the foregoing description is preferred embodiments of the disclosed apparatus and program and that various changes and modification may be made in the invention without departing from the sprit and scope thereof.

What is claimed is:

1. A video recording apparatus for recording an input video signal comprising:
    a first recorder to record the input video signal, as a moving picture, in a first storage medium with a first compression technique;
    a second recorder to record the input video signal, as a moving picture, in a second storage medium different from the first storage medium in storage format with a second compression technique different from the first compression technique, the input video signal being simultaneously recorded in the first and second storage media; and
    an eraser to erase the moving-picture file from the second storage medium, wherein the first and second time information for the erased moving-picture file are not erased from the data file, and the video signal corresponding to the erased moving-picture file is not erased from the first storage medium.

2. The video recording apparatus according to claim 1 further comprising a time-information generator to generate a plurality of pieces of time-information, wherein the first recorder records the time information in the first storage medium with the input video signal whereas the second recorder records a moving-picture file in the second storage medium with the second compression technique per cut of the input video signal located between recording start and recording stop in one-time recording and also a data file corresponding to the moving-picture file, the data file including first time information and second time information both generated by the time-information generator, the first time-information indicating a recording-start time per cut and the second time-information indicating a recording-stop time per cut.

3. A video recording method of recording an input video signal comprising the steps of:
    recording the input video signal, as a moving picture, in a first storage medium with a first compression technique;
    recording the input video signal, as a moving picture, in a second storage medium different from the first storage medium in storage format with a second compression technique different from the first compression technique, the input video signal being simultaneously recorded in the first and second storage media; and
    erasing the moving-picture file from the second storage medium, wherein the first and second time information for the erased moving-picture file are not erased from the data file, and the video signal corresponding to the erased moving-picture file is not erased from the first storage medium.

4. The video recording method according to claim 3 further comprising the steps of:
    generating a plurality of pieces of time-information;
    recording the time information in the first storage medium with the input video signal; and
    recording a moving-picture file and a data file corresponding to the moving-picture file in the second storage medium with the second compression technique per cut of the input video signal located between recording start and recording stop in one-time recording, the data file including first time information and second time information both generated by the time-information generator, the first time-information indicating a recording-start time per cut and the second time-information indicating a recording-stop time per cut.

* * * * *